United States Patent
Matula et al.

(10) Patent No.: US 9,258,421 B2
(45) Date of Patent: Feb. 9, 2016

(54) SPEECH ANALYTICS: CONVERSATION TIMING AND ADJUSTMENT

(71) Applicant: Avaya, Inc., Basking Ridge, NJ (US)

(72) Inventors: Valentine C. Matula, Granville, OH (US); Keith Ponting, Malvern (GB)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/268,966

(22) Filed: May 2, 2014

(65) Prior Publication Data

US 2015/0319305 A1 Nov. 5, 2015

(51) Int. Cl.
*H04M 3/51* (2006.01)
*H04M 3/523* (2006.01)

(52) U.S. Cl.
CPC .......... *H04M 3/5175* (2013.01); *H04M 3/5133* (2013.01)

(58) Field of Classification Search
CPC ..................... H04M 3/5133; H04M 3/5175
USPC .......................... 379/265.06, 265.07, 265.08
See application file for complete search history.

(56) References Cited

U.S. PATENT DOCUMENTS

| 8,204,884 B2 * | 6/2012 | Freedman | G06Q 30/06 379/265.06 |
|---|---|---|---|
| 2008/0049795 A1 * | 2/2008 | Lakaniemi | H04L 43/087 370/516 |
| 2008/0240374 A1 * | 10/2008 | Conway et al. | 379/67.1 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |
| 2015/0195406 A1 * | 7/2015 | Dwyer | H04M 3/5175 379/265.07 |

* cited by examiner

Primary Examiner — Harry S Hong
(74) Attorney, Agent, or Firm — Sheridan Ross P.C.

(57) ABSTRACT

Agents of a contact center often encounter conversational delays when speaking with a customer. These delays may be introduced by transmission delays, which include the distance between the agent and the customer, and processing delays, such as those introduced by systems and processes within a contact center. By providing an agent with information based on the amount of the delay, the agent can be prompted to overtalk the customer by a target amount. As a result, the customer may experience a more natural conversation with the agent. Furthermore, if a customer prefers more or less of a delay, such as based on their cultural norms, the delay may be modified to account for those cultural norms and better accommodate the conversational preferences of a diverse customer base.

20 Claims, 6 Drawing Sheets

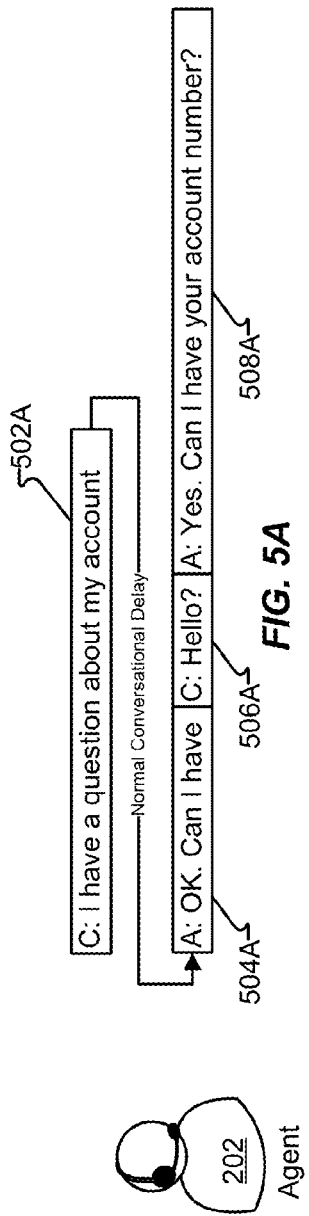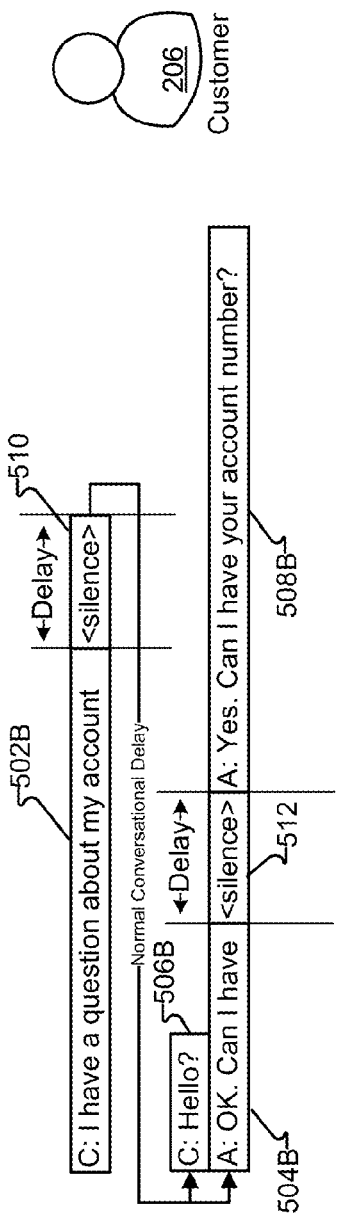

SPEECH ANALYTICS: CONVERSATION TIMING AND ADJUSTMENT

FIELD OF THE DISCLOSURE

The present disclosure is generally directed toward speech analytics and specifically toward speech analytics within a contact center environment.

BACKGROUND

Spoken communication between individuals is a fundamental aspect of human nature. Delays, pauses, interruptions, overtalking, etc. may convey, intentionally or unintentionally, a meaning beyond the words themselves. One significant problem with calls, especially cell phone, voice over IP, or voice/video conference calls, is that there can be serious transmission and codec encoding/decoding delays, which substantially affect interactions. There are also cultural aspects to conversations that should be considered. For example, a longer pause in Japanese might be indicative of respect. The manner in which people interact and factors that impact conversation are large concerns for contact centers.

Anyone that has made a call between two cell phones in the same room has likely experienced this large delay firsthand—speaking into one phone, the voice is reproduced on the second handset over a second later.

On the other hand, the delay on a landline PSTN link or VoIP equivalent can be quite low. A G.711 codec has negligible delay other than the frame and packetization delay of 10 or 20 ms. Transmission may add 60-80 ms, and so the end to end delay will typically be under 150 ms.

A customer's perception of the agent and/or the company may be adversely affected based on the conversation delay being inappropriate. On the other hand, a customer may be well-aware of the delay and may think a contact center agent is quite responsive and helpful; however, a post hoc analysis of a highly-delayed call may result in the contact center agent being given a poor grade even though the agent was doing everything within their power to provide the appropriate amount of customer service.

SUMMARY

It is with respect to the above issues and other problems that the embodiments presented herein were contemplated. Certain embodiments disclosed estimate the delay experienced in a customer/client side of a conversation and provides means to account and compensate for the delay. Other embodiments include conversation analytics that account for delay in assessing a contact center agent's performance.

For communications with high delay, the agent might be perceived as being "attentive" if they begin speaking as they hear the customer complete a sentence—because the agent is hearing the customer after significant delay, and the path from the agent to the customer will add more delay. If the agent speaks before they hear the customer's last bit of speech, the customer may then perceive the conversation as proceeding in a normal pace.

On the other hand, if the agent then does the same "overtalk response" to a customer on a low delay circuit, the agent will be speaking over the customer, and the customer will likely perceive this as the agent being pushy, rude, or not caring about the customer's statement.

Furthermore, even if the agent correctly anticipates the delay for every call, one must remember that the call is likely recorded for quality monitoring purposes. On playback, it will appear that for some calls, the agent is impolite and overtalking the customer, but polite on other calls. If the agent is not coached, then on low delay calls the customer will appear to be happy, while on high delay calls the customer may be displeased or even complain with statements, such as, "are you listening" or "pay attention" due to long pauses between interactions—especially if the pause is a combination of transmission delays and delays in the agent understanding a statement, interacting with a computer screen, etc.

A system is disclosed that may coach the agent on how best to talk with the detected summation of delays. The estimated delay on the client side would be added to measured network, codec, and other delays as an aggregate number to give an agent an estimate of how quickly to respond or how much overtalk should be employed to effectively balance the conversation based on conversation analytics. Similarly, automated agents, such as interactive voice response ("IVR") systems may similarly be given an overtalk amount in order to facilitate a more appropriate delay as observed by the customer. In certain other embodiments, a transmission delay is inserted by the recording equipment, which is often co-located with the agent or otherwise records substantially the agent's perspective of the call, into the recorded call such that that recording better reflects the customer's experience with the call. Subsequent conversational analysis processes may then properly take into account the end-to-end delay and its effect on the perceived experience of the customer when analyzing the conversation.

Conversational Analysis ("CA") is a method commonly used to study both verbal and non-verbal interactions, covering both casual conversations and task-oriented exchanges. CA examines the social organization of conversations, typically through the use of recordings and transcriptions. CA typically employs sampling techniques and coding procedures, testing, and statistics. CA is designed to provide a specific kind of insight into the way people interact.

In today's telephony systems, especially when the media includes video, delays range from small and imperceptible to big and call impacting. Transmission delays may be measured/estimated using ping or traceroute. Processing delays, such as for codecs can also be factored in (e.g., G.729, 10-15 ms; G.711, 125 ms; Facetime, 40-50 ms delay).

Common delay specifications may include (in milliseconds):

0-150: Acceptable for most user applications;
150-400: Acceptable provided that administrators are aware of the transmission time and the impact it has on the transmission quality of user applications; and
Above 400: Unacceptable for general network planning purposes.

A customer may sit on a call to a contact center with significant delay for 0.5 to 0.75 seconds. During this time, the customer may be wondering if an agent is still listening, if the call is still up, etc. The delay may cause overlap, customer dissatisfaction, abandonment, and other woes. Overlap is where an agent and a customer either speak at the same time or both wait for the other to speak, both of which are undesirable in the contact center.

Certain embodiments described provide for a system that is able to provide feedback on the delay to an analyzer using a data channel. The data channel may be used to detect when someone is talking and/or done talking. The CA would be run from the perspective of the customer, rather than the agent. The aggregated information could be used to coach an analytics system, an automated system, or an agent to adjust a conversation based on the delay.

A display may be provided to the agent to provide suggestions for overtalk and/or adjustments for talking to the customer to sound appropriately responsive.

In one embodiment, a method is disclosed, comprising: accessing a transmission delay value of a communications system, the transmission delay value indicating the transmission delay of at least a voice portion of an intended conversation between an agent and a customer; accessing a processing delay value of the communications system, the processing delay value indicating the processing delay of at least a voice portion of the intended conversation; calculating an overtalk amount as the sum of the transmission delay value and the processing delay value; and providing an indicator of the overtalk amount, at least one of, the agent and a call analytics engine.

In other embodiment, a system is disclosed, comprising: a processor; an agent device; an agent display; a network interface operable to facilitate communication between the agent device and a customer device; and wherein the processor is operable to: access a transmission delay value of a communications system, the transmission delay value indicating the transmission delay of at least a voice portion of an intended conversation between an agent and a customer; access a processing delay value of the communications system, the processing delay value indicating the processing delay of at least a voice portion of the intended conversation; calculate an overtalk amount as the sum of the transmission delay value and the processing delay value; and cause an indicator of the overtalk amount to be provided to, at least one of, the agent and a call analytics engine.

In yet another embodiment, a non-transitory computer readable medium is disclosed with instructions thereon that when read by the computer cause the computer to perform: accessing a transmission delay value of a communications system, the transmission delay value indicating the transmission delay of at least a voice portion of an intended conversation between an agent and a customer; accessing a processing delay value of the communications system, the processing delay value indicating the processing delay of at least a voice portion of the intended conversation; calculating an overtalk amount as the sum of the transmission delay value and the processing delay value; and providing an indicator of the overtalk amount, at least one of, the agent and a call analytics engine.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures:

FIGS. 5A and 5B depict one conversation segment between an agent and a customer without overtalk correction;

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
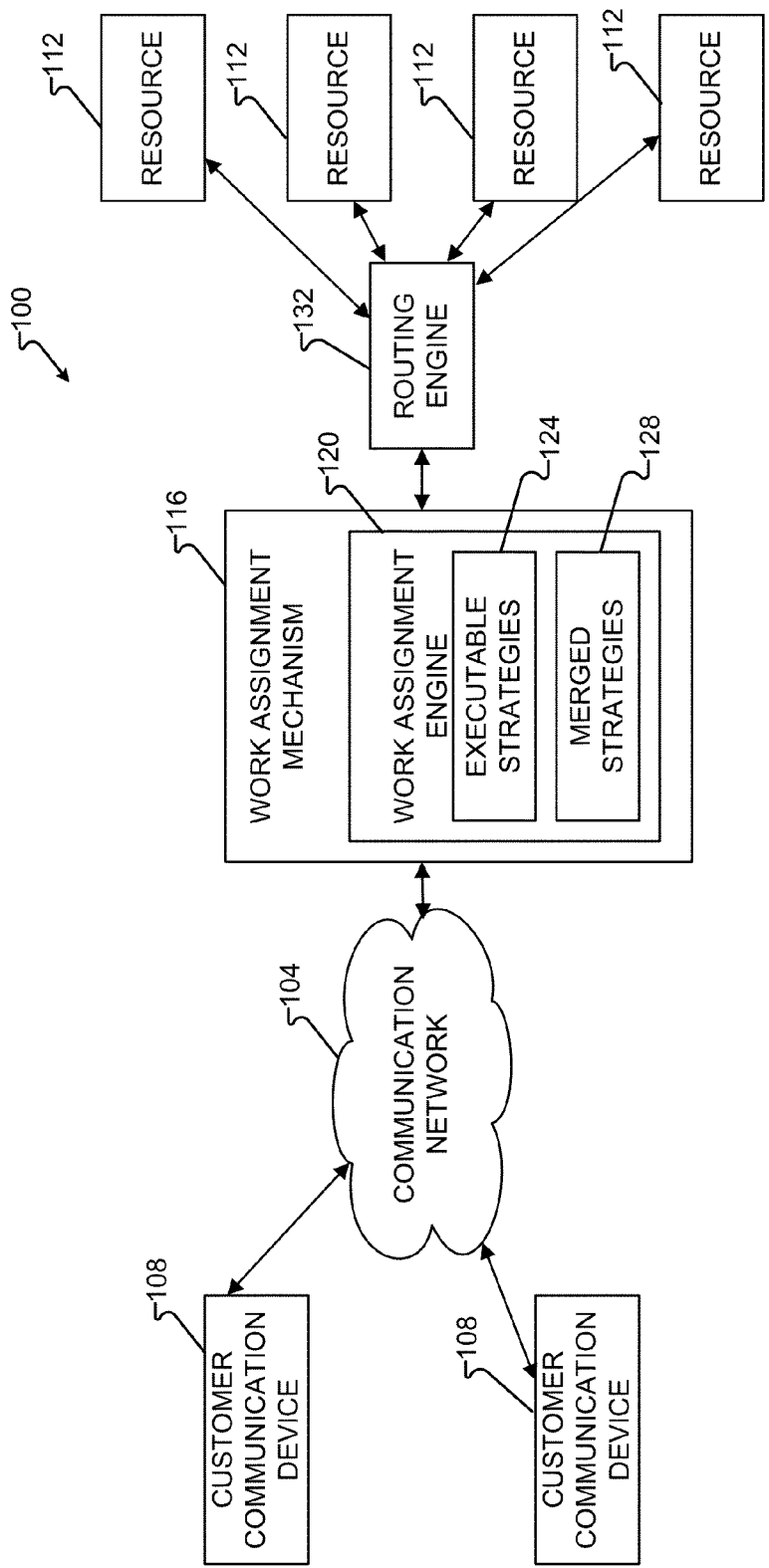
FIG. 1 depicts a communication system in accordance with embodiments of the present disclosure.

FIG. 1 shows an illustrative embodiment of communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center.

More specifically, the work assignment engine 120 comprises executable strategies 124 that, when executed, enable the work assignment engine 120 to determine which of the plurality of processing resources 112 is qualified and/or eligible to receive the work item and further determine which of the plurality of processing resources 112 is best suited to handle the processing needs of the work item. In situations of work item surplus, the work assignment engine 120 can also make the opposite determination (i.e., determine optimal assignment of a work item to a resource). In some embodiments, the work assignment engine 120 is configured to achieve true one-to-one matching by utilizing bitmaps/tables and other data structures.

In accordance with at least some embodiments of the present disclosure, the work assignment engine 120 may be configured to execute one or several executable strategies 124 to make work assignment decisions. As will be discussed in further detail herein, the work assignment engine 120 may comprise a plurality of executable strategies 124, where one or more of the executable strategies 124 include one or many tasks that are performed by the work assignment engine 120 during execution of the executable strategy 124. The order or manner in which the tasks of a strategy 124 are executed by the work assignment engine 120 may be defined by rules or policies, which may also be included in the executable strategy 124.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

Figure 2:
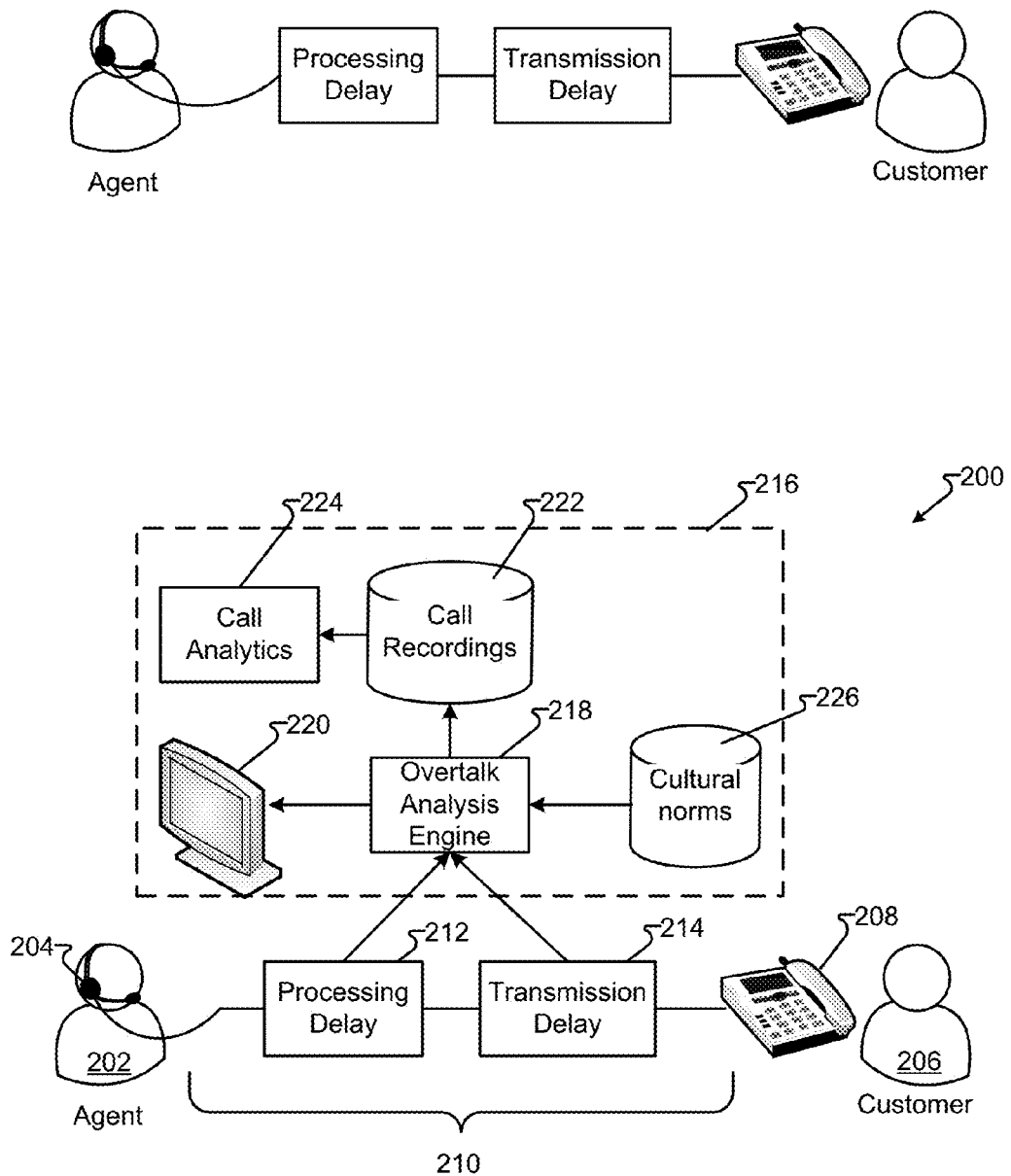
FIG. 2 depicts a communication system in accordance with at least some embodiments of the present disclosure.

FIG. 2 shows a diagram of communication system 200 in accordance with at least some embodiments of the present disclosure. In one embodiment, agent 202 is or will be engaged in a conversation with customer 206 via communication network 210. As mentioned above, certain well-known components are omitted for purposes of avoiding unnecessary complications to the figure. Agent 202 is, one embodiment of resource 112 operable to receive work assignments from routing engine 132 and work assignment mechanism 116. The work assignments may require agent 202 to place or receive a call. Agent 202, utilizing communication device 204, is or will be engaged in a conversation with customer 206 utilizing customer device 208 which may be a voice call and/or a video call with a voice portion. Agent device 204 and/or customer device 208 may be one or more of POTS telephone, SIP endpoint, VoIP telephone, cellular telephone, video display/capture device, and/or other communication device operable to accommodate, at least, voice communication from agent 202. Similarly, communication network 210 may comprise one or more of cellular network, wired data network, wireless data network, public switched telephone network, satellite links, Internet, and/or other communication conduit operable to enable agent 202 utilizing agent device 204 to communicate with customer 206 using customer device 208.

Communication network 210 comprises various components (not shown for clarity). Despite the great speeds in which the various components may operate, communication network 210 inevitably comprises processing delay 212 and transmission delay 214. For clarity, only one of each type of delay is shown—in general there may be multiple delays of each type occurring in any order. In one embodiment, processing delay 212 represents signal processing equipment, such as that maintained by a contact center to enable agent device 204 to connect to networks outside of the contact center. For example, codecs to convert analog signals into packets for transport on digital networks, such as the Internet, is one example of processing delay 212. In another embodiment, transmission delay 214 comprises the delay introduced by distance and/or systems on communication network 210, which is generally outside of the control of a contact center (e.g., telephone company central office hardware and software). As mentioned, distance may be a significant portion of transmission delay 214. If agent 202 and customer 206 are on opposite sides of the Earth, even signals traveling at the speed of light introduce a delay that is readily perceived by human participants. As a result, real-time communication generally has at least some delay. The total delay may range from unperceivable, to noticeable, and on to significant and disruptive. As a benefit of certain embodiments disclosed herein, agent 202 may be provided with a cue to overtalk customer 206 by an amount determined to provide customer 206 with a more natural conversational experience.

In one embodiment, overtalk system 216 determines specific values of processing delay 212 and/or transmission delay 214 and provides a cue, such as via agent display 220, to agent 202 on the degree of overtalk desired for a particular customer 206. As the components causing processing delay 212 are generally accessible to a particular contact center, processing delay 212 may be determined by direct observation. Utilization of known or estimated values of components may also be utilized (e.g., published specifications for a particular component). Processing delay 212 may be substantially static and vary, or be suspected of varying, only upon the installation and/or removal of components and processes of a contact center. Certain variations may occur, such as during times of high contact center utilization, processing delay 212 may be greater than at times of low contact center utilization. Accordingly, processing delay 212 may be determined on a call-by-call basis, periodic basis, or one-time basis in accord with the variability of the processing delay.

In another embodiment, transmission delay 214 may be determined on a call-by-call basis to account for, in part, the geographic distance between customer 206 and agent 202. Delays introduced by known or suspected hardware and/or software may also be utilized. Transmission delay 214 may be generalized such that determining transmission delay 214 may occur less frequently than a call-by-call basis. For example, all customers (e.g., a plurality of customer 206) within a particular region may be associated with the same transmission delay 214. Similarly, calls to the cellular telephone of customers may be subject to an additional delay specific to all cellular calls or calls known to utilize a particular cellular network or technology may have a known or determined increment to the transmission delay based on land-line communications. Transmission delay 214 may vary based, at least in part, on the time of day, week, holiday, disaster, or other one-time or periodic events.

In another embodiment, overtalk analysis engine 218 determines an overtalk amount comprised of processing delay 212 and/or transmission delay 214. In addition to the mathematical operation to determine the overtalk amount, certain key words or phrases spoken by customer 206 may be indicative of too much or too little overtalk. For example, if customer 206 routinely repeats the first sound or syllable (e.g., "I . . . I have another question") that may be an indication that they are hearing agent 202 at a time when they believe it is their turn to speak and overtalk analysis engine 218 may decrease the value of the overtalk amount accordingly. In another example, if customer 206 says words, phrases, or what is believed or known to be a partial word or phrase associated with determining if agent 202 is still engaged in the call (e.g., "H," "Hello?" "Are," "Are you . . . ," etc.), overtalk analysis engine may then increase the overtalk amount.

In another embodiment, overtalk analysis engine 218 accesses at least one record within cultural norms database 226. For example, if customer 206 is known or suspected to be Japanese, where more delay between speakers is a sign of respect and politeness, then overtalk analysis engine 218 accesses a record within cultural norms database 226 associated with Japan and/or Japanese natives to retrieve a corresponding cultural delay. As a result, overtalk analysis engine 216 may consider processing delay 212, transmission delay 214, and/or a cultural delay to determine an overtalk amount. The cultural delay may be result in an increase, decrease, or no chance in the overtalk amount, as compared to the delay determined from processing delay 212 and/or transmission delay 214. For example if the overtalk amount, based on processing delay 212 and transmission delay 214, is 0.5 seconds, but the cultural norm for customer 206 indicates that 0.5 seconds is appropriate, then the net overtalk amount would be zero.

In another embodiment, overtalk analysis engine 218 causes an indicator to display on agent terminal 220 indicating the overtalk amount and/or their current overtalk amount. This aspect of the disclosure will be discussed more completely with respect to FIG. 3.

The performance of agent 202 may be analyzed in real time or at a later time. If agent 202 is engaged in a call with non-trivial delays, a recording of such a call made substantially from the perspective of agent 202, may incorrectly indicate agent 202 is interrupting or talking over customer 206. Accordingly, in another embodiment, a delay is inserted agent's 202 channel to simulate the conversation from the perspective of customer 206. Overtalk analysis engine 218 may insert or cause the insertion of such a delay such that call recordings database 222 records the call from the simulated perspective of customer 206. Alternatively, the delay may be inserted during, or prior to, playback of a recording. As a result, call analytics engine 224 which may be a human and/or automated examination of a prior call, may be presented with and analyze the call from the perspective of customer 206. Call analytics engine 224 may alternatively access a live feed of a call with the appropriate delay of the overtalk amount inserted therein.

Figure 3:
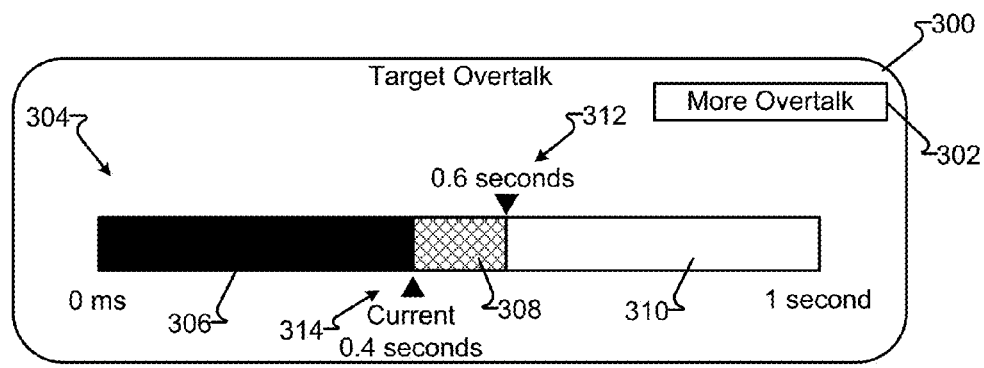
FIG. 3 depicts a dialog window in accordance with at least some embodiments of the present disclosure.

FIG. 3 shows a portion of agent display 220 displaying dialog window 300 in accordance with at least some embodiments of the present disclosure. In one embodiment, dialog window 300 is operable to provide a visual display of at least a target overtalk indicator to agent 202. It should be appreciated that dialog window 300 represents one means to provide visual information to agent 202 and that embodiments providing audio or tactile cues may also be implemented without departing from the teachings herein.

In one embodiment, dialog window 300 includes text status 302, such as to instruct agent 202 to apply more overtalk. In another embodiment, thermometer-style display 304 provides a more detailed display of the current and target overtalk amount. Showing a current graphical overtalk portion 306, an unutilized graphical overtalk portion 310, and discrepancy graphical overtalk portion 308. It should be noted that other graphical, textual, audio, and/or tactile displays may be utilized without departing from the teachings herein. In another embodiment, current indicator 314 shows a current overtalk amount 314 (e.g., 0.4 seconds) and/or a target overtalk amount 312 (e.g., 0.6 seconds).

The determination of the current overtalk amount may be based on the last communication exchange or an average or other mathematical operation of a number of communication exchanges. An average overtalk may be determined for a particular conversation as one means of providing current indicator 314. In another embodiment, outlier high or low observed overtalk values may be discarded, such as when agent 202 has a legitimate reason to interrupt customer 206 (e.g., "Are you sure it was on the 14$^{th}$?" (customer 206 begins speaking) "Found it. It was on the 17$^{th}$."). Accordingly, an unusually high degree of overtalk may be discarded from the current overtalk calculation. Similarly, longer pauses may be indicative of waiting for a system to retrieve information or perform an operation or for agent 202 to ponder a particular issues and, therefore, unusually long periods of pausing may similarly be excluded from a current overtalk calculation.

Figure 4:
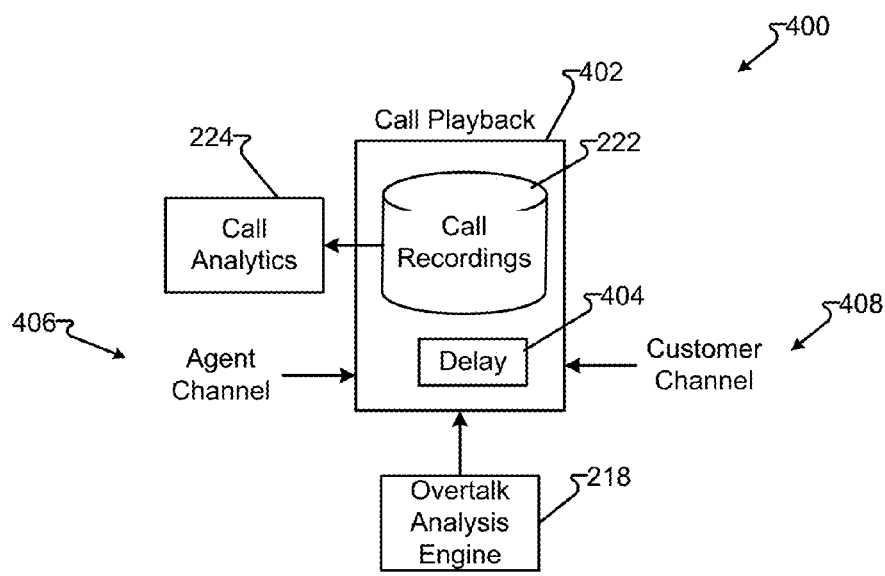
FIG. 4 depicts a call analysis system in accordance with at least some embodiments of the present disclosure.

FIG. 4 shows call analysis system 400 in accordance with at least some embodiments of the present disclosure. In one embodiment, overtalk analysis engine 218 determines an overtalk value and provides the overtalk value to call playback system 402 to be maintained as delay 404. Communication from agent channel 406 is then buffered or otherwise delayed by delay 404 to simulate the call experience from the perspective of customer 206. Customer channel 408 and/or agent channel 406 is then provided to call analytics engine 224 in real time or recorded by call recordings database 222 to be made available to call analytics engine 224 at a later time.

FIGS. 5A and 5B show a conversation segment between agent 202 and customer 206 without overtalk correction. Customer 206 speaks customer portions 502, 506 and agent 202 speaks agent portions 504, 508. As illustrated with respect to FIG. 5A, agent 202 hears customer 206 speak customer portion 502, in its entirety, and then speaks agent portion 504. Then, agent 202 is interrupted by customer 206 speaking customer portion 506. From the perspective of agent 202, customer portion 506 appears to come unexpectedly as agent 202 is currently speaking Agent 202 then continues with agent portion 508.

As illustrated with respect to FIG. 5B, customer 206 speaks customer portion 502 and fails to receive a reply during silence 510. Customer 206, wondering if agent 202 is still there, then speaks 506, however, as customer 206 is speaking, customer 206 hears agent portion 504, and stops talking Silence 512 follows and customer 206 may again be wondering if agent 202 is still on the call, however, by pausing slightly longer, customer 206 then hears agent portion 508. The exchange illustrated by FIGS. 5A and 5B may be functional but without overtalk correction, silences 510, 512 cause a clumsy and awkward exchange. Customer 206 may have an unsatisfactory experience and may even abandon the call.

Figure 6A:
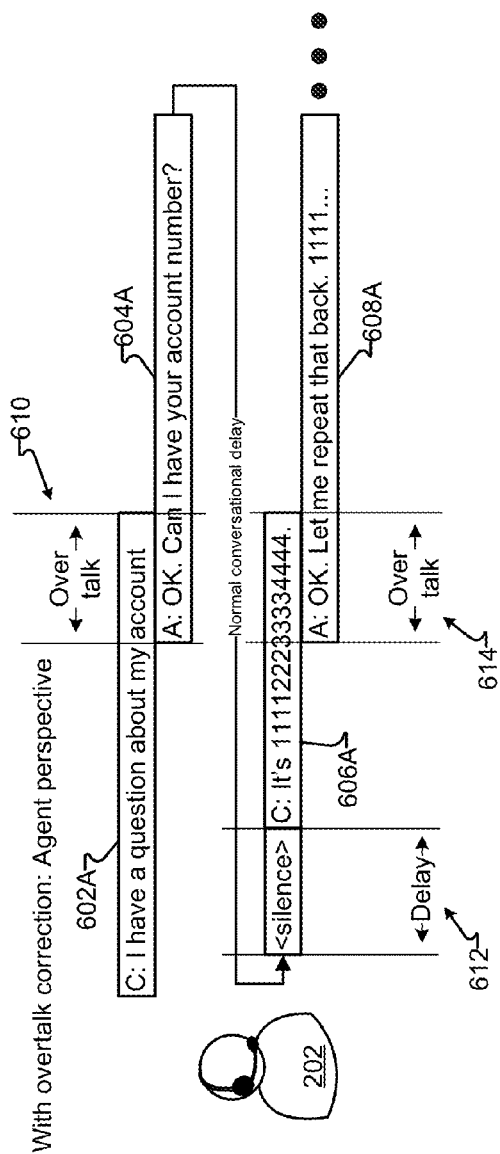
FIGS. 6A and 6B depicts a second conversation segment between an agent and a customer using overtalk correction in accordance with at least some embodiments of the present disclosure.
Figure 6B:
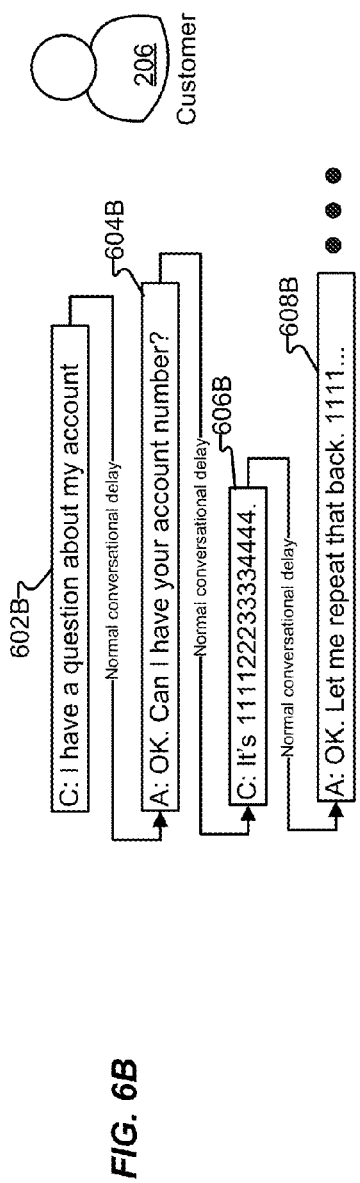

FIGS. 6A and 6B show a conversation segment between agent 202 and customer 206 using overtalk correction in accordance with at least some embodiments of the present disclosure. As illustrated with respect to FIG. 6A, customer 206 speaks customer portions 602, 606 and agent 202 speaks agent portions 604, 608. Agent 202 is trained and/or prompted, such as by dialog window 300, to overtalk customer 206. Agent 202, determining that customer portion 602 is about to end, begins speaking customer portion 604 with overtalk amount 610. Agent 202 then experiences silence 612, which should be expected by agent 202. Agent 202 then hears customer portion 606 and begins speaking agent portion 208 with overtalk amount 614.

As illustrated with respect to FIG. 6B, the experience from the perspective of customer 206 is a more natural flow. Customer 206 speaks customer portion 602, after a normal conversational delay hears agent portion 604, responds with customer portion 606 and, after another normal conversational delay, hears agent portion 608. In another embodiment, the normal conversational delay, may be a delay determined with respect to a cultural norm, as described more fully with respect to FIG. 2.

Figure 7:
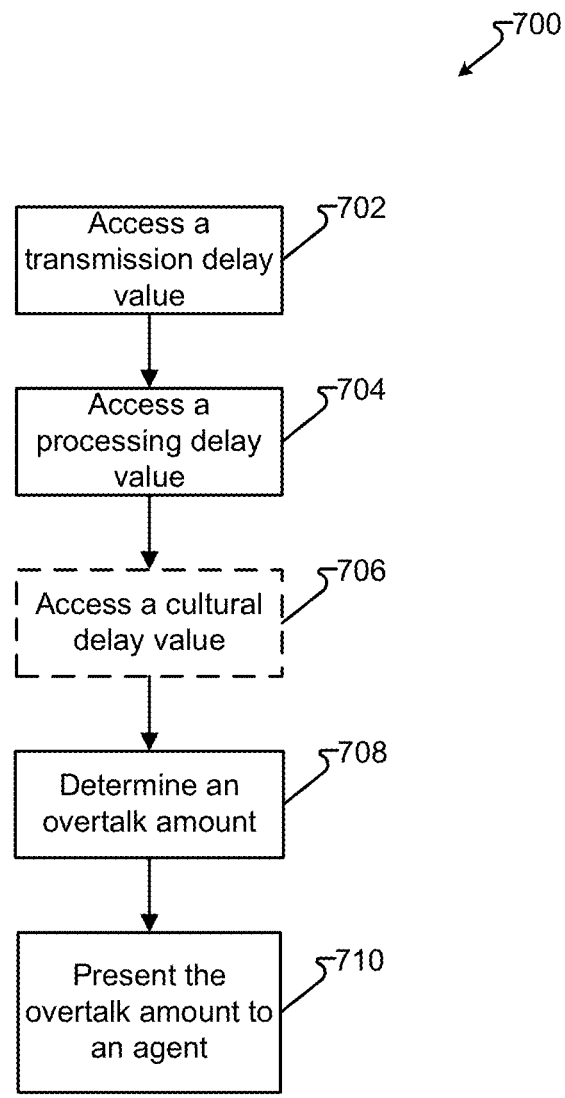
FIG. 7 depicts a process in accordance with at least some embodiments of the present disclosure.

FIG. 7 shows process 700 in accordance with at least some embodiments of the present disclosure. In one embodiment, a processor, such as or controlled by or integral to overtalk analysis engine 218, determines a transmission delay value for a current or prospective call between agent 202 and customer 206. Step 702 may be calculated or, for at least one portion of the transmission delay, may be a retrieved stored value, such as a typical delay encountered with the same customer 206 or with other customers within a similar geographic area as customer 206.

Step 704 accesses a processing delay for the call. Step 704 may access a stored value, such as when equipment associated with supporting the call has not changed and is the embodying system has a processing delay that is substantially static. However, in other embodiments, step 704 may determine the processing delay on a call-by-call basis or for a number of calls or other periodic basis. For example, all voice-only calls to customers may have one delay, however, all video calls may have an additional delay representing video encoding/decoding and other additional processes. Similarly, calls utilizing POTS may have one processing delay whereas VoIP calls may have another processing delay. Step 704 may determine a single value for all processing delays for a current or prospective call.

Optionally, step 706 may determine a cultural norm delay. This reflects an assumed customer characteristic that customer 206 may prefer to have a certain length of a pause between speakers of a conversation. As a result, the overtalk amount produced by step 708 may be increased or decreased such that the end result is an appropriate cultural norm delay for the particular customer 206. Step 710 then presents the target overtalk amount to agent 202 to prompt agent 202 to overtalk customer 206 the target value.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
measuring, by a processor, a transmission delay value of a communications system, the transmission delay value indicating the transmission delay of at least a voice portion of a conversation between communication devices of an agent and a customer;
measuring, by the processor, a processing delay value of the communications system, the processing delay value indicating the processing delay of at least a voice portion of the conversation;
calculating, by the processor, an overtalk amount as the sum of the transmission delay value and the processing delay value; and
providing, by the processor, in response to a signal from the processor, an indicator of the overtalk amount to at least one of the agent or a call analytics engine.

2. The method of claim 1, wherein calculating the overtalk amount further comprises adding to the overtalk amount a third delay value, the third delay value indicating a cultural norm for conversational delay.

3. The method of claim 1, further comprising:
inserting, by the processor, a simulated delay of the overtalk amount into the agent's portion of the conversation; and
providing, by the processor, in response to a signal from the processor, a recording of the conversation, with the simulated delay, to a call analyzer.

4. The method of claim 3, wherein the call analyzer is a recording device.

5. The method of claim 3, further comprising:
recording, by the processor, in response to a signal from the processor, the conversation from a perspective substantially equivalent to the agent's perspective; and
wherein inserting the simulated delay and providing the recording are performed during playback of the recording.

6. A communication system, comprising:
a processor;
an agent device;
an agent display;
a network interface operable to facilitate communication between the agent device and a customer device; and
wherein the processor programmed to:
measure a transmission delay value of the communications system, the transmission delay value indicating the transmission delay of at least a voice portion of a conversation between communication devices of an agent and a customer;
measure a processing delay value of the communications system, the processing delay value indicating the processing delay of at least a voice portion of the conversation;
calculate an overtalk amount as the sum of the transmission delay value and the processing delay value; and
cause an indicator of the overtalk amount to be provided to at least one of the agent display for display thereon or a call analytics engine.

7. The system of claim 6, further comprising:
a database having stored therein a third delay value, the third delay value indicating a cultural norm for conversational delay; and
wherein the processor is further operable to calculate the overtalk amount by adding the third delay value thereto.

8. The system of claim 6, wherein the processor is further programmed to:
insert a simulated delay of the overtalk amount into the agent's portion of the conversation; and
provide a recording of the conversation, with the simulated delay, to a call analyzer.

9. The system of claim 8, wherein the processor is operable to provide the recording to a recording device.

10. The system of claim 8, wherein:
a recording device records the conversation from a perspective substantially equivalent to that of the agent device; and
wherein the processor is further operable to insert the simulated delay into the recorded conversation and provide the recorded conversation during playback.

11. A non-transitory computer readable medium with instructions thereon that when executed by a processor cause the processor to:
measure a transmission delay value of a communications system, the transmission delay value indicating the transmission delay of at least a voice portion of a conversation between communication devices of an agent and a customer;
measure a processing delay value of the communications system, the processing delay value indicating the processing delay of at least a voice portion of the conversation;
calculate an overtalk amount as the sum of the transmission delay value and the processing delay value; and
provide an indicator of the overtalk amount to at least one of the agent or a call analytics engine.

12. The non-transitory medium of claim 11, wherein the instructions to calculate the overtalk amount further comprises instructions that when executed causes the processor to add to the overtalk amount a third delay value, the third delay value indicating a cultural norm for conversational delay.

13. The non-transitory medium of claim 11, wherein the instructions further comprise instructions that when executed causes the processor to:
insert a simulated delay of the overtalk amount into the agent's portion of the conversation; and
provide a recording the conversation, with the simulated delay, to a call analyzer.

14. The non-transitory medium of claim 13, wherein the instructions further comprise instructions that when executed causes the processor to:
record the conversation from a perspective substantially equivalent to the agent's perspective; and
wherein the instructions to insert the simulated delay and providing the recording are performed during the execution of the instructions to perform the playback of the recording.

15. The method of claim 1, wherein measuring the transmission delay value further comprises transmitting at least one of a ping or a traceroute and determining the measured transmission delay by using the at least one of the ping or the traceroute.

16. The method of claim 1, wherein calculating the overtalk amount further comprises calculating the overtalk amount in accord with a spoken indicator associated with the overtalk amount being too much or too little.

17. The method of claim 1, wherein calculating the overtalk amount further comprises calculating the overtalk amount in accord with a delay associated with a prior call.

18. The method of claim 1, wherein calculating the overtalk amount, further comprises, calculating the overtalk amount to include an estimated transmission delay.

19. The method of claim 1, wherein calculating the overtalk amount, further comprises, calculating the overtalk amount to include an estimated number of transmission components and the delay associated therewith.

20. The method of claim 1, wherein calculating the overtalk amount, further comprises, calculating the overtalk amount to include a geographic distance between the agent and the customer.

* * * * *